United States Patent [19]

Brutsman

[11] 4,354,605

[45] Oct. 19, 1982

[54] ADJUSTABLE DISPENSER

[75] Inventor: James W. Brutsman, Cheyenne, Wyo.

[73] Assignee: AMF Incorporated, White Plains, N.Y.

[21] Appl. No.: 129,515

[22] Filed: Mar. 12, 1980

[51] Int. Cl.³ ............................ A47B 9/02; B65G 5/02
[52] U.S. Cl. .................................. 211/49 D; 108/136; 221/279; 312/71
[58] Field of Search ............... 211/49 D; 312/71, 306; 108/136; 221/279; 269/303, 319, 900

[56] References Cited

U.S. PATENT DOCUMENTS

| 2,147,800 | 2/1939 | Sadowski | 269/900 |
| 3,339,912 | 9/1967 | Stack | 269/900 |
| 3,463,479 | 12/1966 | Hennessey | 269/900 |
| 3,565,500 | 2/1971 | Shelley | 312/71 |
| 3,717,397 | 2/1973 | Cummings | 312/71 |
| 3,863,576 | 2/1975 | Olsson | 108/136 |
| 3,949,190 | 4/1976 | Landry | 211/49 D |
| 4,161,146 | 7/1979 | Koolman | 211/49 D |
| 4,206,954 | 6/1980 | Koolman | 211/49 D |

FOREIGN PATENT DOCUMENTS 2259027 6/1973 Fed. Rep. of Germany ...... 269/900

Primary Examiner—James T. McCall
Attorney, Agent, or Firm—David E. Dougherty; Charles J. Worth

[57] ABSTRACT

Adjustable wire guide rods are selectively positioned in holes in the movable dispenser table so that it can handle different size dishes.

3 Claims, 3 Drawing Figures

ADJUSTABLE DISPENSER

This invention relates to a dispenser, and more particularly, to a low cost, minimum parts, adjustable dispenser.

Although not necessarily restricted thereto, the invention is particularly adapted to making circular dish dispensers adjustable. One form of said dispenser is shown in Olsson U.S. Pat. No. 3,863,576 (1975) and Landry U.S. Pat. No. 3,949,190 (1976), both assigned to the same assignee as the instant invention. Both of these patents show the same basic dispenser, the second however adapting the first for heating. Briefly, these circular dish dispensers comprise a circular tube or frame having a tubular outline, and a spring loaded movable carriage therein with an overlying table or platform. They are intended to dispense a certain size dish, depending on their inner diameter, but are not suitable for dispensing a stack of dishes having a much smaller diameter.

In the invention I provide low cost and minimum parts means for adapting this type of dispenser to handle much smaller dishes as well.

Figure 1:
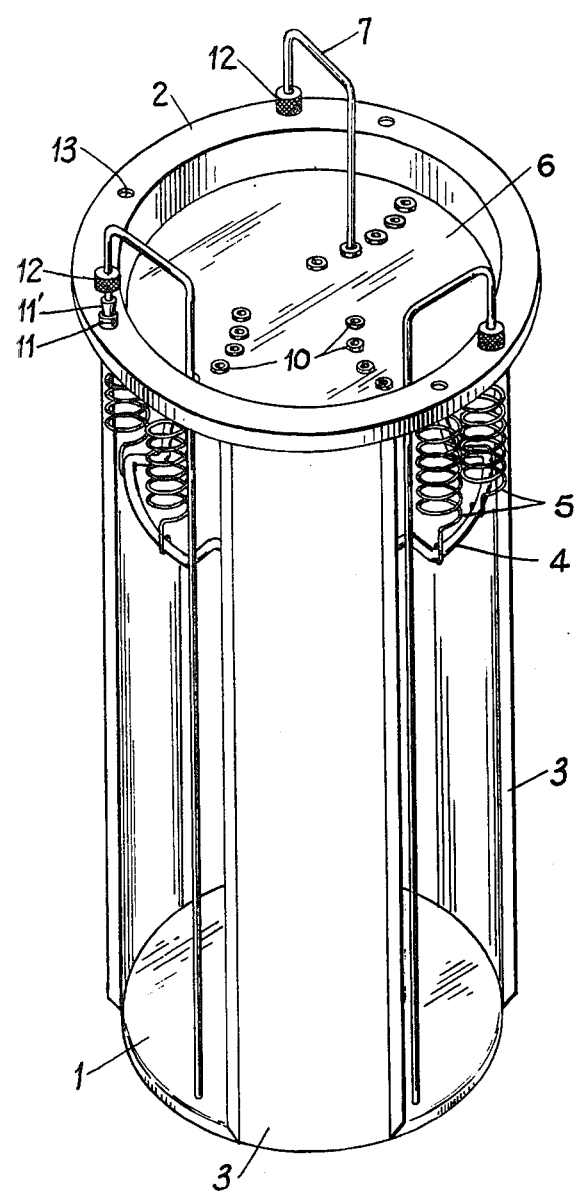
FIG. 1 is a perspective view of a dish dispenser embodying my invention.
Figure 2:
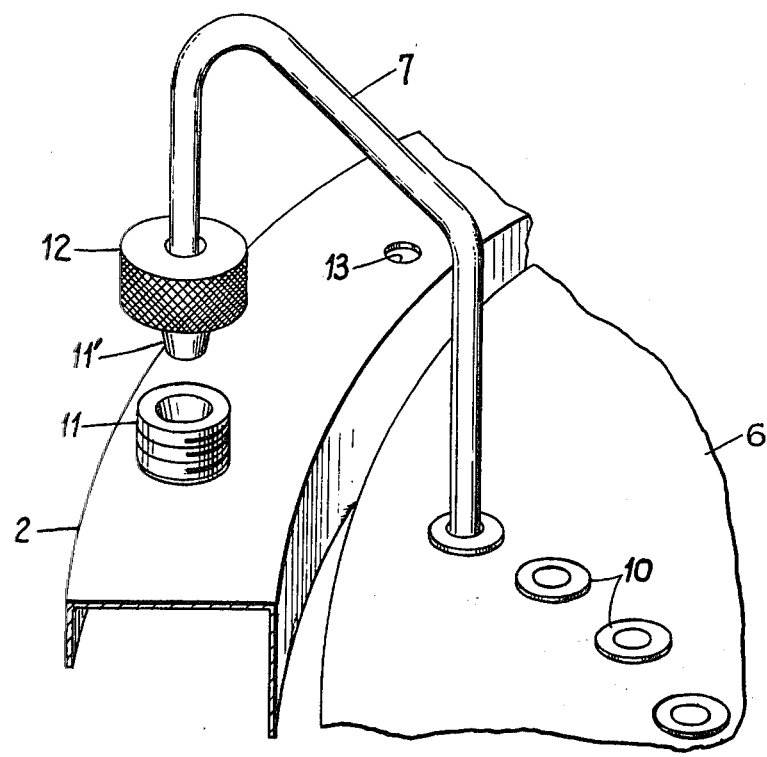
FIG. 2 is an enlarged broken away perspective view of the adjusting means of the invention.

As shown in FIG. 1, the dispenser, which is of the type shown in the earlier mentioned two patents, comprises a bottom plate 1, a top flange 2, vertical side members 3 interconnecting the two into a frame having a tubular outline, a movable internal carriage 4 suspended off the frame by springs 5, and a top table or platform 6 overlying the carriage 4 and movable up and down therewith.

Due to the internal diameter of the circular flange 2 and the tubular shaped frame, the device is obviously designed to handle dishes of a certain size. In order to handle a stack of dishes of much smaller size a plurality of wire guide rods 7 are utilized to make the device adjustable. Depending upon the positioning of the rods 7 different size smaller dishes can be dispensed by the unit.

Figure 3:
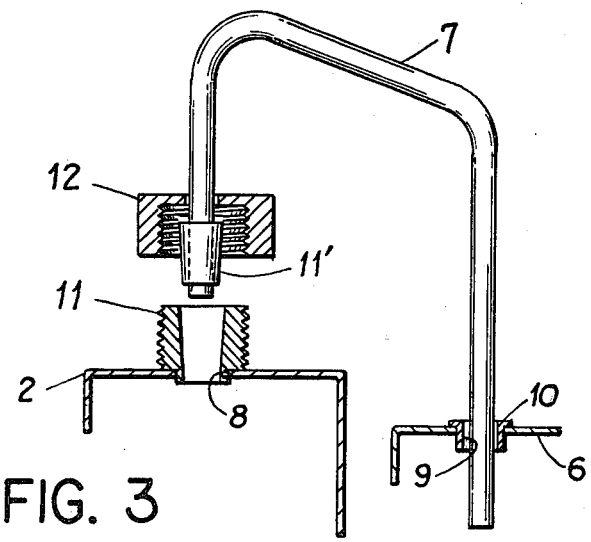
FIG. 3 is a broken away sectional view thereof.

The guides 7, in this case three in number, have an inverted L-shape. The short legs thereof enter holes 8 (see FIG. 3) in the flange 2 and the long legs thereof go through holes 9 in the table 6 down towards the bottom plate 1 but don't have to be connected thereto, in which event they are easily removable.

There are a plurality of holes 9 for each guide 7 arranged along an arc transcribed by swinging the rods about their holes 8. The holes 9 are fitted with guide bushings 10. After the rods 7 are set in position a stack of dishes will fit in between the long legs of the rods 7 which served as steady guides for the stack as it rises or lowers with the table.

The outer ends of the rods are held in the holes 8 by two Morse tapered fittings 11, 11', the first being affixed to flange 2 and threaded, and the second being on the rods. A clamp 12 on the rods 7 threads on the part 11 to lock the rods in position.

When not in use to in effect reduce the diameter of the dispenser, the rods 7 are withdrawn from within the table and inserted into other holes 13 in the flange 2. That is, in the stored position of the rods they are positioned with both legs thereof in the flange 2 and extending down alongside the dispenser unit.

It will now be seen that I provide an adjustable dispenser at minimum cost and extra parts. This is essentially the wire guide rods 7 and the holes therefor in the table 7 and flange 2; and, depending upon the disposition of the holes and in which ones the rods are inserted different size dishes or other stacked material can be handled, or the rods can be kept on the unit but stored in an out of the way position.

I claim:

1. In a dispenser having an elongated shape with a surrounding annular top flange and a table movable lengthwise therein toward and away from said flange, means for adapting said dispenser to handle stacks of material of different sizes said means comprising a plurality of wire guide rods releaseably connected only to said top flange and extending downwardly therefrom lengthwise of said dispenser and only through said table and thereby being removable from said dispenser; and said guide rods extending through said table being positioned relative to one another to receive and steady a stack of material of a predetermined size.

2. In a dispenser as in claim 1, and said rods having an inverted L-shape with short and long legs;

a plurality of angularly shaped holes in said flange each receiving the short leg of a different one of said guide rods;

a plurality of series of holes in said table each spaced along an arc transcribed around a different one of said holes in said flange; and said long leg of each of said guide rods selectively extending through a hole of a different one of said series of holes.

3. In a dispenser as in claim 2, means for clamping said short legs in said flange holes, guide bushings in said table holes for said long legs, and additional holes in said flange for said long legs for stored position of said guide rods on said flange alongside said dispenser.

* * * * *